United States Patent [19]
Kazo et al.

[11] Patent Number: 6,039,412
[45] Date of Patent: Mar. 21, 2000

[54] CARD RECOVERY METHOD AND CARD ISSUING APPARATUS

[75] Inventors: Osamu Kazo; Tsuyoshi Kokubo, both of Tokyo, Japan

[73] Assignee: NEC Corporation, Tokyo, Japan

[21] Appl. No.: 09/114,899

[22] Filed: Jul. 14, 1998

[30] Foreign Application Priority Data

Jul. 14, 1997 [JP] Japan .................................. 9-188285

[51] Int. Cl.⁷ .................................................. H03M 13/00
[52] U.S. Cl. .......................................... 311/39.1; 235/437
[58] Field of Search ............................ 371/39.1; 235/437

[56] References Cited

U.S. PATENT DOCUMENTS 5,771,245   6/1998   Zilang ..................................... 371/39.1

FOREIGN PATENT DOCUMENTS 63-1836   1/1988   Japan .
5-36568   5/1993   Japan .

*Primary Examiner*—Harold I. Pitts
*Attorney, Agent, or Firm*—Foley & Lardner

[57] ABSTRACT

The present invention relates to a card (such as a cash card) reject and recovery method, enabling to provide a reduced size of card reading/issuing apparatus capable of identifying an error cause for respective cards. The card issuing apparatus comprises: an embosser for embossing an error identification pattern on a card; an information reader for reading an information of a card; and a controller for determining, according to the information of the card, whether the card has an error. The card recovery method comprises steps of: feeding a card which has been determined to have an error, to the embosser; identifying an error identification pattern; and embossing on a card determined to have an error, a corresponding error identification pattern.

15 Claims, 4 Drawing Sheets

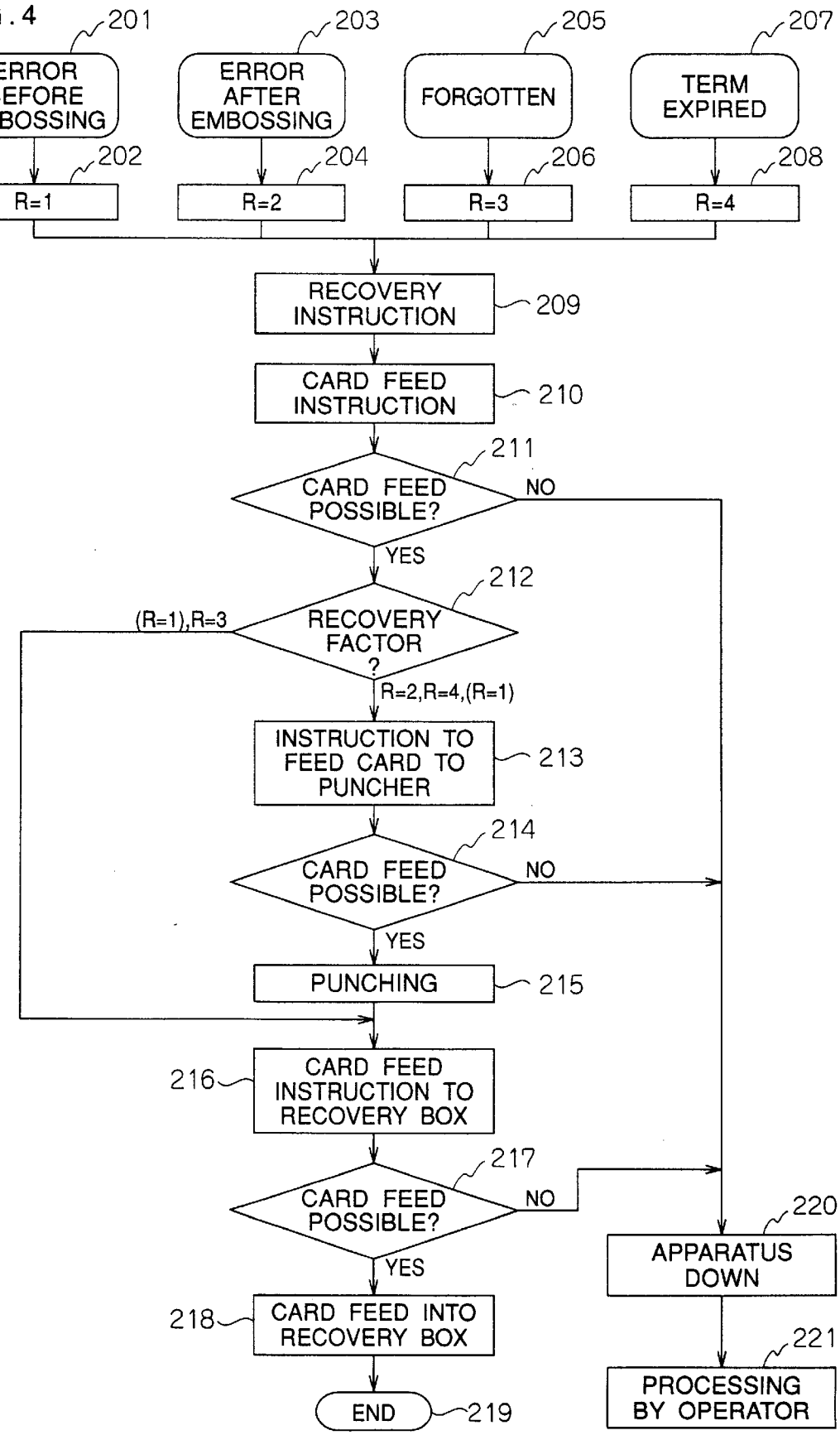

CARD RECOVERY METHOD AND CARD ISSUING APPARATUS

BACKGROUND OF THE INVENTION

1. Field of the Invention

The present invention relates to a method for rejection and recovery of cards such as cash cards, and more particularly to a card issuing apparatus and a card reading apparatus.

2. Description of the Related Art

Conventionally, when rejecting a card which has caused an error during a card issuing or when recovering an invalid card such as a card whose term has expired, the card is directly fed to a reject or recovery box without processing the card. For example, this method is disclosed in Japanese Utility Model, Publication of Unexamined Application A-63-1836. Hereinafter, the term 'recovery' is to be understood to include 'rejection'.

Moreover, Japanese Utility Model Publication 5-36568 discloses a reject/recovery method using a recovery box divided into a plurality of sections (rooms) for containing a card rejected due to an error, a card to be recovered, and a card which has been forgotten. In this case also, cards are fed to the recovery box without being processed.

These two examples disclosed in the aforementioned publications are associated with a recovery method and a recovery mechanism for pre-paid cards such telephone cards and orange cards (for train tickets) which are thinner and softer than cash cards issued by banks. The aforementioned two methods have also been used for recovering cards having a greater thickness and an emboss coding such bank cards and credit cards.

The aforementioned conventional methods, however, has a problem that cards which have been fed to a recovery box have external views not different from normal cards and magnetic stripes operating normally. This leaves a possibility that a recovered card is taken out of the recovery box and its magnetic data is rewritten for an unauthorized use of the card.

Moreover, the conventional method using a single recovery box has an advantage that a space required is small but has a problem that it is impossible to identify the conditions of recovery for respective cards. That is, when a single recovery box is used, a card which has been rejected by an error and a card whose term has expired are fed to be contained in one and the same recovery box. In addition, the recovered cards are not subjected to any processing for identifying recovery conditions.

Furthermore, the conventional method using a recovery box divided into a plurality of sections has an advantage that cards can grouped according to recovery conditions but this method has a problem that the plurality of sections require a plenty of space, which in turn increases an entire apparatus size required.

SUMMARY OF THE INVENTION

It is therefore an object of the present invention to provide a card embosser which enables to visually identify different recovery conditions of respective cards recovered into a recovery box.

Another object of the present invention is to prevent an unauthorized re-use of a card which has been once recovered by rewriting a magnetic data.

Yet another object of the present invention is to reduce a space required for the recovery box, realizing a reduced size of an entire apparatus.

In order to achieve the aforementioned objects, according to the present invention, when rejecting a card which has caused an error during a card issuing procedure using an automatic card issuing apparatus or when recovering an invalid card or a card whose term has expired, an identification patter indicating a reject or recovery factor is embossed on the card to be rejected or recovered before rejection or recovery.

That is, the card issuing apparatus comprises: an embosser for embossing an identification pattern on a card to be issued; an information reader for reading an information of the embossed card; and a controller for determining whether the card as an error according to the information of the card. The card recovery method using this card issuing apparatus comprises a step of feeding a card which has caused an error, to the embosser; a step of identifying an error identification pattern; and a step of embossing the error identification pattern on the card having the error.

According to the present invention, when rejecting a card which has caused an error during a card issuing or when recovering an invalid card of a card whose term has expired, an identification pattern including a character string or phrase identifying a recovery factor such as VOID CARD or ERROR CARD is embossed or a hole is punched on the card before being fed into a recovery box. This enables to identify an error factor through visual observation and facilitates a card processing after the recovery. Moreover, because the recovery factor can easily be identified by visual observation, there is no need of providing a plurality of sections in the recovery box, which contributes to reduce the size of the entire apparatus. Furthermore, by punching a hole on a magnetic stripe, if any provided on card, it is possible to surely prevent an unauthorized reuse of the card.

BRIEF DESCRIPTION OF THE DRAWINGS

FIG. 4 is a flowchart showing an operation of the card embosser according to the second embodiment of the present invention.

DESCRIPTION OF THE PREFERRED EMBODIMENTS

Description will now be directed to preferred embodiments of the present invention with reference to the attached drawings.

Embodiment 1

Figure 1:
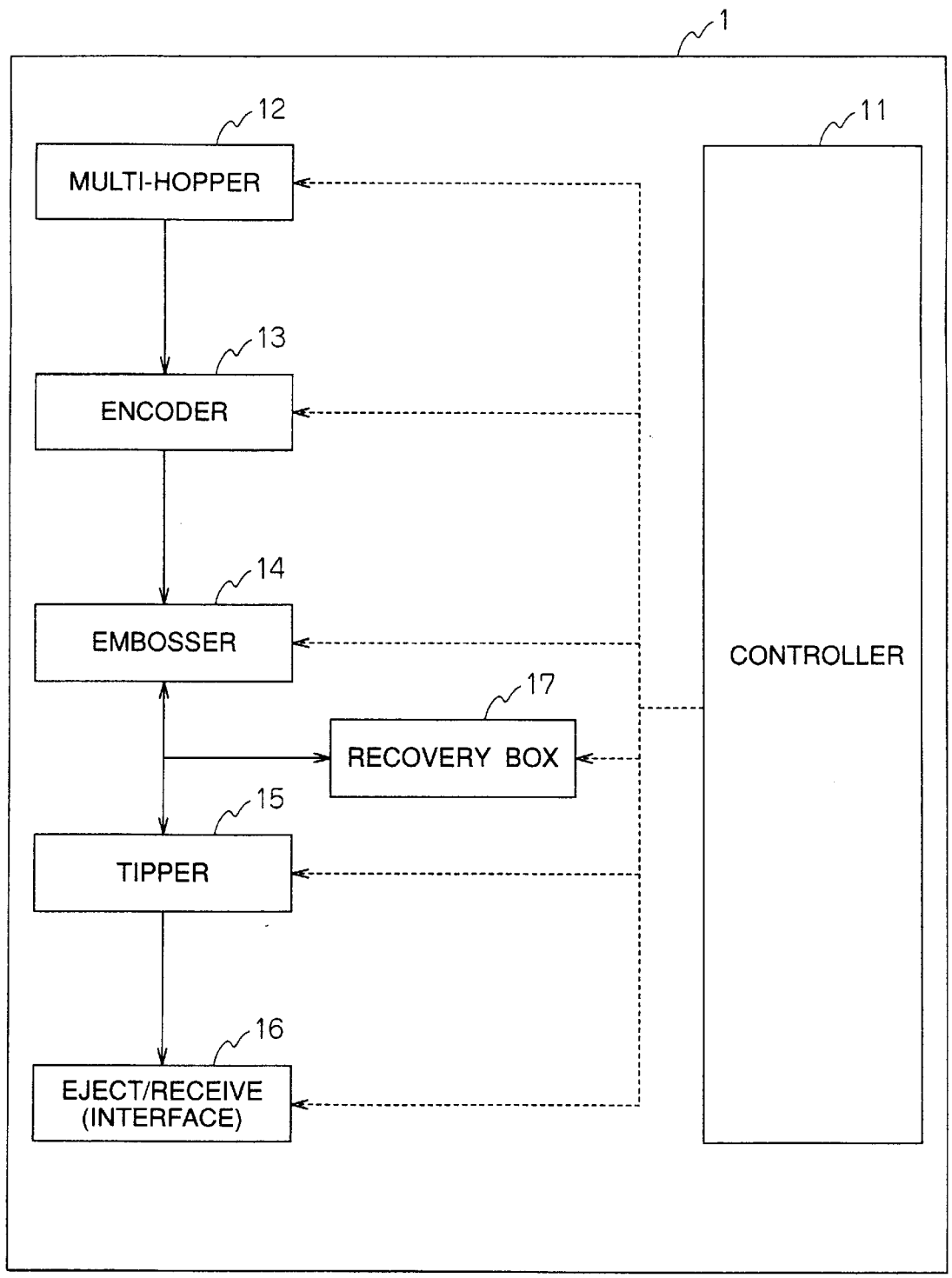
FIG. 1 is a block diagram showing a configuration of a card embosser according to a first embodiment of the present invention.
Figure 2:
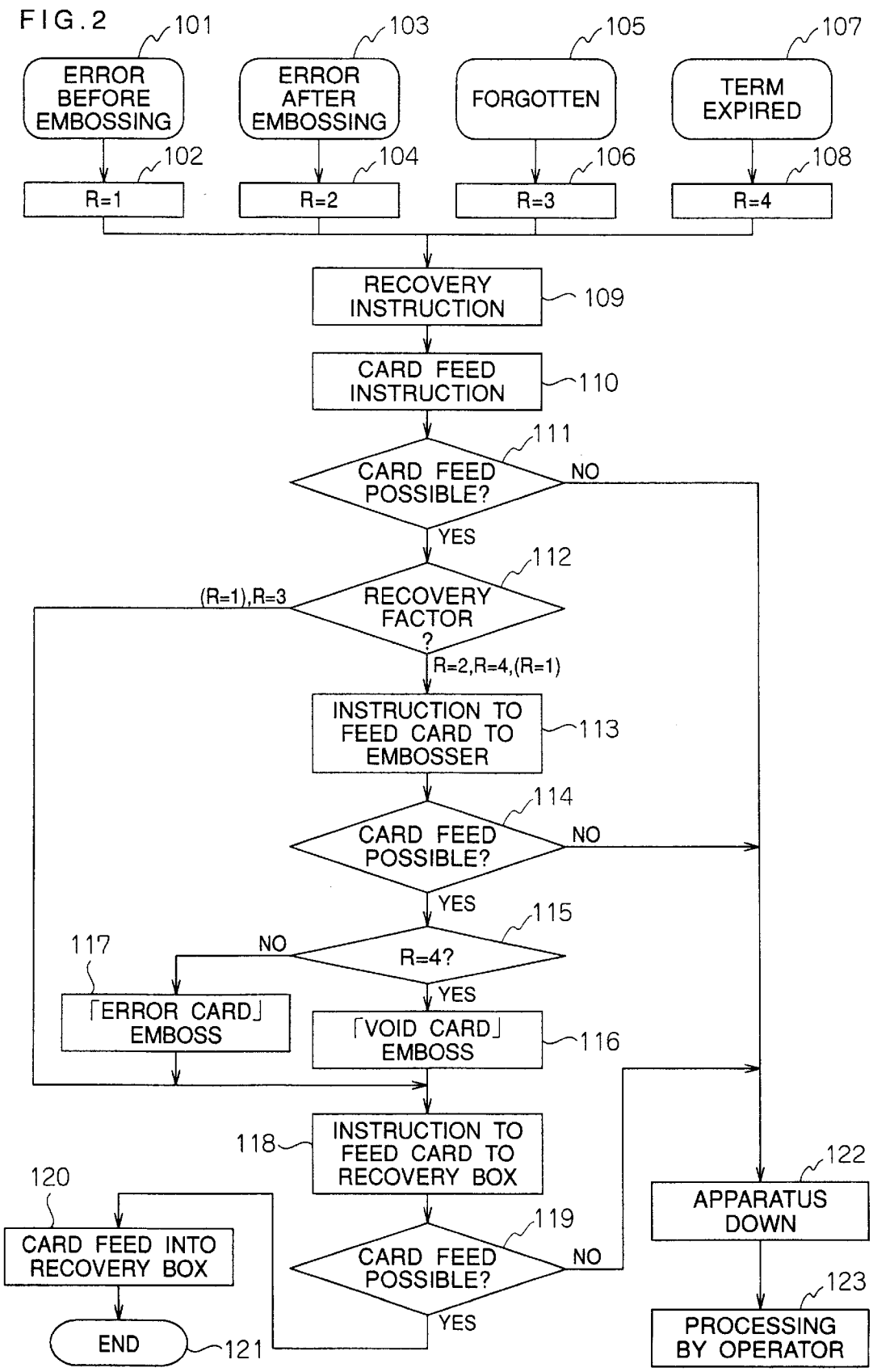
FIG. 2 is a flowchart showing an operation of the card embosser according to the first embodiment of the present invention.

FIG. 1 is a block diagram showing a configuration of a card embosser according to a first embodiment of the present invention and FIG. 2 is a flowchart showing the operation of the card embosser.

This card embosser 1 includes: a multi-hopper block 12 having a mechanism for storing one or more than one kinds of cards to be issued and feeding cards one by one; an encoding block (encoder) 13 for carrying out a magnetic data read-in and write-in to a card fed from the multi-hopper block according to an instruction from a control block 11; an emboss block (embosser) for embossing an account number, a personal name, and the like on a card fed, and embossing an identification pattern for identifying a character or phrase indicating a recovery condition; a tipper block 15 for applying a color to the identification pattern embossed on the card; an eject/receive block (interface) 18 for ejecting a card out of the apparatus or feeding a card inserted into the apparatus, into the interior of the apparatus; a recovery box 17 for accumulating a card which has caused an error during an issuing or a card to be recovered because of term expiration; a control block 11 for controlling operation of and a data for respective components; and feeding means (not depicted) for feeding a card to respective blocks.

The control block 11 controls operation of respective blocks so as to read an encoded information and an embossed information as well as a tipping error information. In the example shown in FIG. 1, operations of the respective blocks constitute an information reader, which may have any configuration if a necessary information can be detected.

Next, an explanation will be given on the operation of this card embosser 1 with reference to the operation flowchart of FIG. 2. Firstly, an outline of a normal card issuing operation will be given. When a host computer (not depicted) issues an instruction for a card issuing, the control block 11 of the card embosser 1 supplies the respective blocks with an operation instruction and a data.

The multi-hopper block 12 which has received the instruction sends out a card specified. The specified card is fed by the feeding means to the encoding block 13. In the encoding block 13, a magnetic data supplied from the control block is written on the card.

After the magnetic data is written in, the card is supplied to the emboss block 14, where a data (such as an account number and a personal name) supplied from the control block 11 is embossed on the card. After the embossing is complete, the card is sent to the tipper block 15, where a color is applied on a pattern embossed in the emboss block 14. After this coloring, the card is sent out of the apparatus through the eject/receive block. Thus, a normal card issuing is complete.

Next, an explanation will given on a specific example of card recovery operation. There are four recovery factors which require a recovery operation. A first factor is that an error is caused prior to embossing on the card in the emboss block 14 (step 101). For example, the error may be an encoding disabled error. A second recovery factor is that an error has occurred after the embossing on the card in the emboss block 14 (step 103). For example, the error may be a tipping error in the tipping block. A third recovery factor is that a card has been prepared normally and fed to the eject/receive block 16 but a wait state continues without removal of the card by a customer who has forgotten about the card (step 105). A fourth recovery factor is that a card whose term has expired is received and new card is to be issued (step 107).

When one of the recovery factors (steps 101, 103, 105, and 107) occurs, a parameter identifying the recovery factor is set in a recovery factor parameter R. If an error occurs prior to embossing (101), R=1 is set (step 102). If an error occurs after embossing (step 103), R=2 is set (step 104). If a card is in a wait state for a long time (step 105), R=3 is set (step 106). If a card whose term has expired is received (step 107), R=4 is set (step 108).

When a recovery factor has occurred, the control block 11 sends a recovery operation instruction to the respective blocks (step 109). The respective blocks receive the instruction and start the recovery operation. Firstly, a card which has caused the recovery factor should be moved away from the site of the recovery factor to the emboss block 14. For this, a feed instruction is issued (step 110) and it is checked whether card can be moved away from the recovery factor site (step 111). If it is decided that the card cannot be carried away from the site (an error such as card clogging), the apparatus down enters a down state (step 122) to wait for a processing by an operator (step 123). If the card can be carried away from the site, the recovery factor is identified (step 112).

In the case of R=1 or R=3, the card is directly carried to the recovery box 17 without being embossed according to a feed instruction (step 118). When R=1, an error has mostly occurred in the encoding block 13 due to a upside-down placement of the card or dust attached onto the magnetic stripe.

Such a card can be used again by removing the error cause and so it is recovered without embossing so as to reset in the multi-hopper block 12. Moreover, when R=3, the customer is expected to return to take the card, and so the card is directly recovered without embossing.

When a feed instruction to the recovery box 17 is issued (step 118), a check is made whether the card can be fed (step 119). If feeding is impossible, the apparatus enters the down state (step 122) so that an operator carries out a necessary processing (step 123). If the feeding is possible, the card is fed to be contained in the recovery box 17 (steps 120, 121). Each of the cards recovered can easily be identified with its recovery factor through its external view. If the recovery factor R=1, the card has no embossed character on the card. If the recovery factor R=3, the card has an embossed character string on the card.

In a case of the recovery factor R=2 or R=4 (or R=1), a feed instruction to the emboss block 14 is issued (step 113) and a check is made to decide whether the card can be fed (step 114). If the feeding is impossible, the apparatus enters the down state (step 122) to waif for a processing by an operator (step 123). If the feeding is possible, the card is fed to the emboss block 14.

When the card has arrived at the emboss block 14, the recovery factor is identified (step 115). If the recovery factor R=2 (or R=1), a character string "ERROR CARD" is embossed on the card indicating that the card has been recovered by an error occurrence (step 117). If the recovery factor R=4, a character string "VOID CARD" is embossed on the card indicating that the card term has expired and the card cannot be used any more (step 116). Thus, different identification patterns are selected according to the recovery factors.

The character strings to be embossed may be other than the "ERROR CARD" and "VOID CARD". If there is no need of identifying the recovery factors, one and the same character string may be used for both of the recovery factors R=2 and R=4. Moreover, a character string may be embossed at any position on the card if within an emboss enabled area. In order to prevent an accident of an unauthorized reuse of the card, it is advantageous to carry out embossing on the magnetic stripe. (That is, if embossing is carried out on the magnetic stripe, it is impossible to read or write a magnetic data on the magnetic stripe, thus preventing an unauthorized reuse of the card.)

A card identified with R=1 may also be subjected to embossing of a character string so that the card which has caused an error will not be used again.

When embossing of a character string identifying a recovery factor is complete, a feed instruction to the recovery box 17 is issued so as to contain the card in he recovery box 17 (steps 118 to 123) as has been described above. A recovery factor of a recovered card can easily be identified from its external view by an operator. If the recovery factor R=2, the card has the character string "ERROR CARD" embossed. If the recovery factor R=4, the card has the character string "VOID CARD" embossed.

Moreover, because the recovery factor can easily be identified from a card external view, cards can be grouped effectively without requiring a plurality of sections in the recovery box 17, which contributes to reduce the size of the entire apparatus. Furthermore, the character strings "ERROR CARD" and "VOID CARD" embossed on cards enable to visually identify incorrect cards, which in turn helps to prevent an unauthorized reuse of the cards. Moreover, when the aforementioned character strings are embossed on the magnetic stripe, it becomes impossible to read or write a magnetic data, which surely prevents an unauthorized reuse of the card.

Embodiment 2

Next, explanation will be given on a second embodiment of the present invention with reference to FIG. 3 and FIG. 4.

Figure 3:
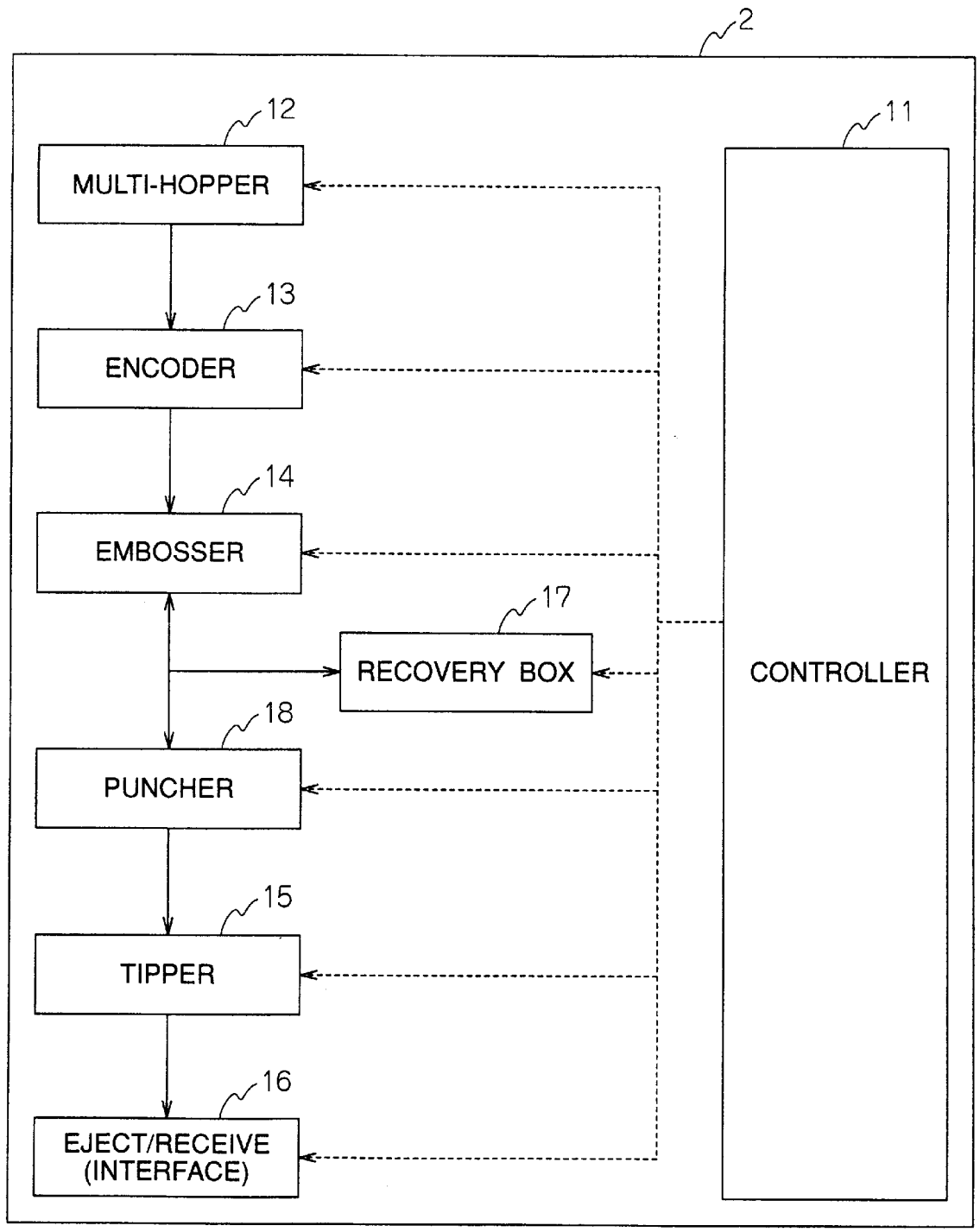
FIG. 3 is a block diagram showing a configuration of a card embosser according to a second embodiment of the present invention.

FIG. 3 is a block diagram showing a configuration of a card embosser according to the second embodiment and FIG. 4 is an operation flowchart of the card embosser.

In the same way as the card embosser 1 of FIG. 1, the card embosser 2 of FIG. 2 includes a multi-hopper block 12, an encoding block 13, an emboss block 14, a tipper block 15, an eject/receive block 16, a recovery box 17, a control block 11, and feed means (not depicted) for feeding a card to respective blocks. In addition, the card embosser according to the second embodiment includes a punch block 18 between the emboss block and the tipper block 15, for punching a hole in an error card or a card whose term has expired. Here, the punch block (puncher) 18 is provided between the emboss block 14 and the tipper block 15, but it is also possible to provide the punch block 18 between the tipper block 15 and the eject/receive block 16, or immediately before the recovery box 17.

Next, explanation will given on the operation of this card embosser 2 with reference to the operation flowchart of FIG. 4. It should be noted that a normal (correct) card issuing is carried out in the same way as in the aforementioned card embosser 1 of FIG. 1.

A card recovery in the second embodiment is carried out as follows. There are four recovery factors. A first recovery factor is that an error has occurred prior to embossing on the card by the emboss block 14 (step 201). For example, an emboss disabled error is caused. A second recovery factor is that an error has occurred after embossing on the card (step 203). For example, the error is a tipping error. A third factor is that a card has been created normally and fed to the eject/receive block 16 but is not removed by a customer who has forgotten about the card (step 205). A fourth factor is that a card whose term has expired is received and a new card is to be issued (step 207).

When one of the recovery factors is caused (steps 201, 203, 205, and 207), a parameter identifying a recovery factor is set in the recovery factor parameter R. If an error is caused prior to embossing (step 201), R=1 is set (step 202). If an error is caused after embossing (step 203), R=2 is set (step 204). If a card remains without being taken away (step 205), R=3 is set (step 207). If a card whose term has expired is received (step 207), R=4 is step (step 208).

When one of the recovery factors is caused, the control block issues an instruction for recovery operation to the respective blocks (step 209). Each of the blocks, upon receiving the instruction, starts a necessary operation. Firstly, the card which has caused a recovery factor should be fed from the site of the recovery factor to the punching block 18. For this, a feed instruction is issued (step 210) and a check is made whether the card can be moved from the recovery factor site (step 211). If the card cannot be moved (card clogging error), the apparatus enters the down state (step 220) waiting for a processing by an operator) step 221). If the card can be moved, the recovery factor is identified (step 212).

In case of R=1 or R=3, the card is carried into the recovery box without being embossed and accordingly an instruction to feed to the recovery box 17 is issued (step 216). In case of R=1, the most considerable error is an error in the encoding block 13 (the magnetic data cannot be read or written). This error is caused mostly when the card is set upside down or there is dust adhering to the magnetic stripe. Such cards can be used again if these causes are eliminated. Consequently, such cards are returned without being embossed so as to be reset in the multi-hopper block 12.

In case of the recovery cause R=3, which means the card is left by a customer and the customer will return to fetch the card, the card should be not be embossed. When an instruction to feed to the recovery box 17 is issued (step 216), it is checked whether the card can be moved (step 217). It the card cannot be moved, the apparatus enters the down state (step 220) to wait for a processing by an operator (step 221).

If the card can be moved, the card is fed to the recovery box 17 (steps 218, 219). Those cards which are fed to the recovery box, an operator can easily identify by visual observation a card of the recovery cause R=1 having an embossed character string.

In case of the recovery cause R=2 or R=4 (or R=1), an instruction to feed to the punching block 18 is issued (step 213) and it is checked whether the card can be moved (step 214). If the card cannot be moved, the apparatus enters the down state (step 220) to wait for a processing by an operator (step 221). If the card can be moved, the card is fed to the punching block 18, where the card is punched to form a hole (step 215).

Here, although not depicted, if it is necessary to identify the recovery causes between R=2 and R=4, it is possible to punch one hole for R=2 and two holes for R=4, for example. Moreover, these holes can be formed at any position within a punching range. However, it is more advantageous to punch holes on the magnetic stripe so as to prevent an unauthorized reuse of those cards. (If a hole is punched on the magnetic stripe, it becomes impossible to read or write a magnetic data, thus disabling an unauthorized reuse of the card.)

Moreover, if a card which has caused an error need not be reused, a card of R=1 can also be punched for identification of the error cause.

When the punching in the punching block 18 is complete, an instruction to feed to the recovery box 17 is issued and the card is fed to the recovery box 17 (steps 216 to 221: Operations in these steps are identical as has been described above). When the number of punched holes is changed according to the recovery factor, an operator can easily identify the error causes of those cards in the recovery box 17 through visual observation: one hole punched if the recovery factor R=2, and two holes punched if the recovery factor R=4.

Moreover, because the recovery factor can be identified by visual observation, the recovered cards can be processed afterward with a high efficiency, and there is no need of providing a plurality of sections in the recovery box 17, which contributes to reduce the apparatus size.

Furthermore, cards having punched holes can easily be distinguished as abnormal cards and this prevents an unauthorized reuse of the cards. Moreover, when the holes are punched on the magnetic stripe, it is impossible to read or write a magnetic data, which surely prevents an unauthorized reuse.

It should be noted that in the aforementioned embodiments, explanation has been given on a case of card having a comparatively great thickness and provided with a magnetic stripe such as bank cards (cash cards) and credit cards. However, the present invention including embossing of an identification pattern can also be applied to other similar cards having a smaller thickness.

As has been described above, according to the present embodiments, when rejecting a card which has caused an error during a card issuing or when recovering an invalid card or a card whose term has expired, character strings indicating the recovery factor such as UNUSABLE and VOID are embossed or holes are punches on the card before being fed to the recovery box. Accordingly, the recovery factors of the recovered cards can easily be identified through visual observation, which enables to process the recovered cards with a high efficiency.

Furthermore, because the recovery factor can be identified by visual observation, there is no need of providing a plurality of sections in the recovery box for containing different recovery factors of the recovered cards. That is, a single recovery box is sufficient, which significantly reduces the entire apparatus size.

Because a recovered card has an emboss or a punched hole, the card can easily be recognized as a abnormal card, which prevents an unauthorized reuse of the card. Moreover, in case an emboss or hole is formed on a magnetic stripe, it is impossible to read or write a magnetic data and accordingly, it is further sure to prevent an unauthorized reuse of the card.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 9-188285 (Filed on Jul. 14$^{th}$, 1997) including specification, claims, drawings and summary are incorporated herein by reference in its entirety.

What is claimed is:

1. A card recovery method in a card issuing apparatus, said card issuing apparatus comprising: an embosser for embossing an identification pattern on a card to be issued; an information reader for reading an information of the card embossed; and a controller for determining whether the card has an error according to said information of the card, said card recovery method comprising steps of:

feeding a card which has caused an error to said embosser;
  identifying an error identification pattern; and
  embossing said error identification pattern on the card which has caused an error.

2. A card recovery method as claimed in claim 1, said method further comprising a step of:

setting a magnetic stripe if any provided on said card, as an embossing position of said identification pattern.

3. A card recovery method as claimed in claim 1, wherein said identification pattern is a character string, phrase, symbol, pictogram, or the like.

4. A card reject or recovery method in a card reading apparatus, said card reading apparatus comprising: an interface for ejecting or inserting a card; an information reader for reading an information of a card inserted into said interface; a controller for determining whether said card has an error according to said information of the card; and a puncher for punching a hole on a card, and said card reject or recovery method comprising steps of:
  feeding a card which has been determined to have an error to said puncher;
  identifying an error identification patter; and
  punching a hole on a card which has been determined to have an error.

5. A card recovery method as claimed in claim 4, wherein said identification pattern is represented by a number of punched holes.

6. A card issuing apparatus comprising:

an embosser for embossing an identification pattern on a card to be issued;
  an information reader for reading an information of the card embossed;
  a controller for determining whether said card has an error according to said information of the card; and
  a recovery box for recovering a card which has been determined to have an error,
  wherein said embosser embosser on a card which has been determined to have an error, an identification pattern corresponding to a type of the error.

7. A card issuing apparatus as claimed in claim 6, wherein if the card which has been determined to have an error has a magnetic stripe, said magnetic stripe is set as an embossing position of said identification pattern.

8. A card issuing apparatus as claimed in claim 7, wherein said identification pattern is a character string, phrase, symbol, pictogram, or the like.

9. Card issuing apparatus as claimed in claim 6, said apparatus further comprising:

an interface for ejecting a card or feeding an inserted card to a feed path;
  a card feeder for feeding a card sent out to the feed path;
  an encoder for recording a data on the card which has been fed; and
  a recovery box for containing a card which has been determined to have an error,
  wherein said controller controls to emboss an identification pattern on the card which has been determined to have an error.

10. A card issuing apparatus as claimed in claim 6, wherein if said card has a magnetic stripe, said controller sets on said magnetic stripe an emboss position of said identification pattern.

11. A card reading apparatus comprising:

an interface for ejecting a card or feeding an inserted card to a feed path;
  an information reader for reading an information of the inserted card;
  a controller for determining whether said card has an error according to said information of the card; and
  a recovery box for containing a card which has been determined to have an error, wherein said controller controls said embosser to emboss an identification pattern on a card which has been determined to have an error, corresponding to a type of said error and to feed the card having the identification pattern embossed, to said recovery box.

12. A card reading apparatus as claimed in claim 11, wherein if the card which has been determined to have an error has a magnetic stripe, said controller sets said magnetic stripe as an emboss position of the identification pattern.

13. A card issuing apparatus comprising:

emboss means for embossing an identification pattern on a card to be issued;

detection means for reading an information of the card embossed;

control means for determining whether said card has an error according to said information of the card; and recovery means for recovering a card which has been determined to have an error, wherein said emboss means emobosses on a card which has been determined to have an error, an identification pattern corresponding to a type of the error.

14. A card issuing apparatus as claimed in claim 6, wherein if the card which has been determined to have an error has a magnetic stripe, said control means sets said magnetic stripe as an emboss position of said identification pattern.

15. A card issuing apparatus as claimed in claim 7, wherein said identification pattern is a character string, phrase, symbol, pictogram, or the like.

* * * * *